INVENTOR.
WALTER WALISCH
BY
ATTORNEY

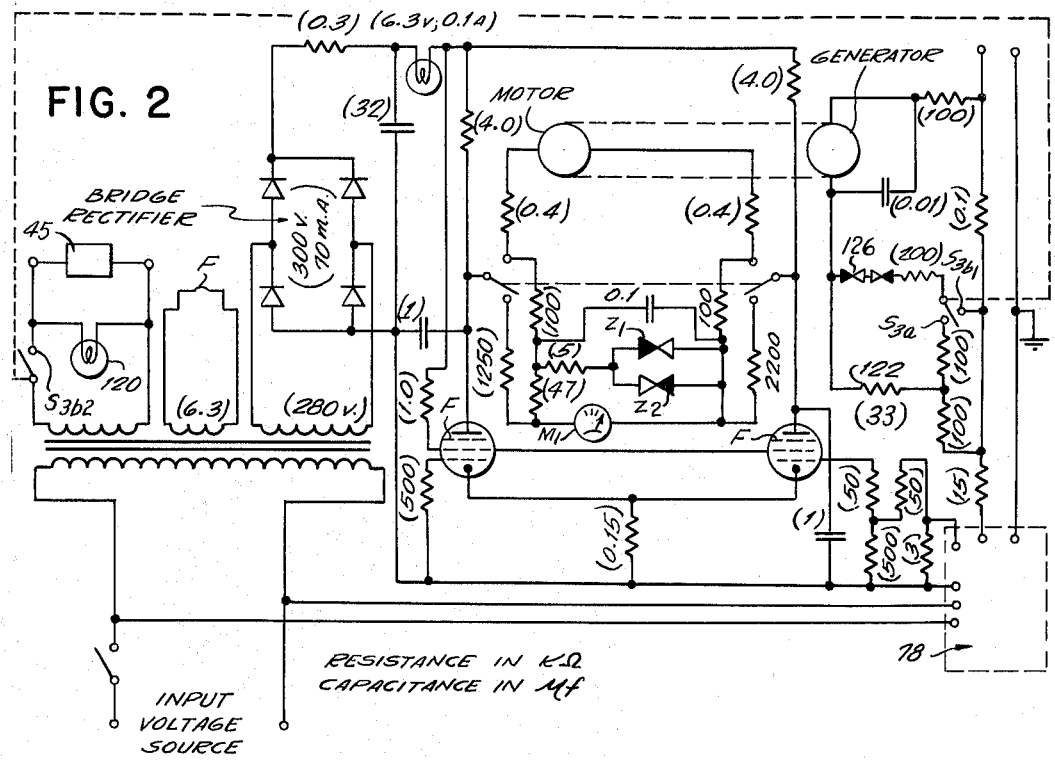
FIG. 2
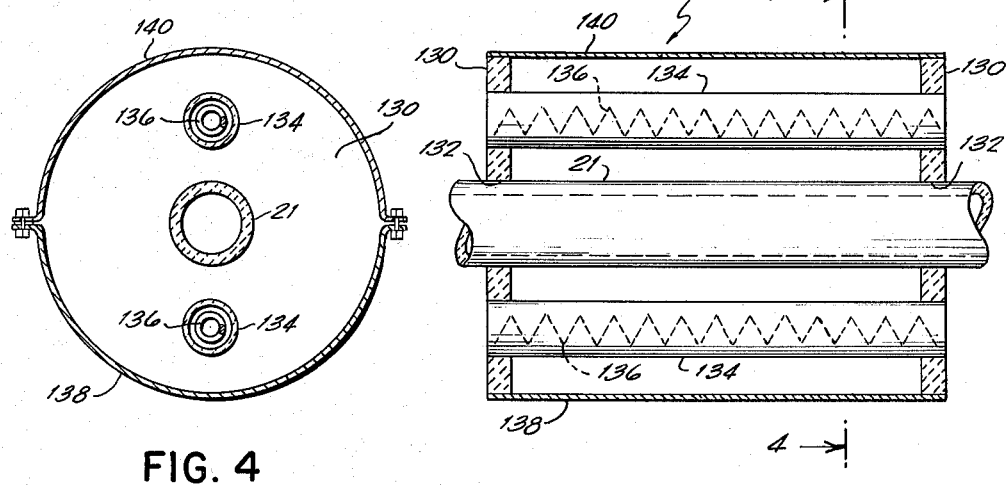
FIG. 4
FIG. 3
INVENTOR.
WALTER WALISCH
ATTORNEY

United States Patent Office 3,241,922
Patented Mar. 22, 1966

3,241,922
INSTRUMENTATION FOR THE AUTOMATIC, SIMULTANEOUS ULTRAMICRO DETERMINATION OF THE C-H-N CONTENTS OF ORGANIC COMPOUNDS
Walter Walisch, Scheidt, Saar, Germany, assignor to Technicon Instruments Corporation, Chauncey, N.Y., a corporation of New York
Filed Dec. 28, 1962, Ser. No. 248,131
2 Claims. (Cl. 23—253)

The invention relates to an instrumentation for the elemental analysis of C, H and N contents of organic compounds, that is the percentage of carbon, hydrogen and nitrogen.

The main purpose of the invention is to eliminate as much as possible the many difficult manual operations required in the usual methods for carbon, hydrogen and nitrogen determination, by substituting these with an automatic devices, eliminating thereby the danger of adversely affecting the results of the measurements, and to prevent the possibility of obtaining incorrect measuring results. Furthermore, the usual method of separate determinations of carbon, hydrogen and nitrogen are to be replaced by one single combined method for all three elements. In combination with the automatic execution of these determinations, this permits a considerable increase in the number of determinations that can be made within the same period of time. A further goal of this invention is the reduction of the currently required sample quantity for a C-H-N determination of from 5 to 10 mg. (in the micro range), to a quantity of only about 400 micro g. (ultra micro range), and to achieve this without causing any reduction in the accuracy of the C and N values under measurement. At the same time the invention will also permit a considerably improved accuracy in the determination of the hydrogen content, which, as is known, cannot be measured sufficiently accurately with the known method.

The basic principles of a procedure for simultaneous determinations of C, H and N, and which eliminates some of the serious disadvantages of the usual methods, have been described in "Chemische Berichte," No. 94, pages 2314–2327, published 1961, and in the book entitled "Eine Schnellmethode zur Ultramikro-Bestimmung des C-H-N Gehaltes Organischer Verbindungen," by Walter Walisch, Saarbruecken, 1962. In this procedure the compound undergoes combustion within a stream of helium and oxygen. The combustion products are first carried through a reduction tube filled with copper, then through a small column of silica gel, where the water is adsorbed. The carbon dioxide and nitrogen are introduced with the helium stream into a catharometer cell. The voltage output of the catharometer bridge is integrated by an integrator having a compensating network at its input to provide an output reading which is proportional to the carbon and nitrogen contents. After passing through a time delay tube and a carbon dioxide adsorption tube, the nitrogen enters the second catharometer cell, in which it causes a rotation of the integrator proportional to the nitrogen content. Then the water is expelled by heating the silica gel column, and is read on the integrator in the same manner.

As described in the above-mentioned "Eine Schnellmethode zur Ultramikro-Bestimmung des C-H-N Gehaltes Organischer Verbindungen," the measuring instrumentation used in connection with the above described method is not adequate to comply with all requirements. In particular, it does not take advantage of the possibilities inherent in automation; the accuracy of the measuring results is insufficient; one C-H-N determination still requires a sample quantity of 1 mg.; the preparation and maintenance operations (preparation of the helium-oxygen mixture, reduction of the used-up copper in the reduction tube, and exchange of the absorption tube), are relatively substantial; furthermore, the considerable heating capacity of the furnaces requires either a long preheating period, and consequently a smaller number of daily analyses or— in continuous operation—a shorter life of the filling; the poor heating characteristics of the combustion furnace, consisting in the considerable temperature reduction at the ends of the furnace, requires the use of a second furnace ahead of the copper oxide filling (auxiliary heater), into which the substance is introduced. Because of the relatively large quantity of sample required, many groups of substances cannot be analyzed, particularly explosives, or compounds where combustion is difficult. The rigid connection between combustion tube and reduction tube, creates a definite danger of breakage due to the expansions and contractions, which are bound to occur when the instrument is turned on or off. The attachment of the water absorption tube for purification of the carrying gases directly to the gas cylinder, entails several connections, which cannot be controlled, and this may cause high readings of blank water values, and makes it impossible to use a good flexible connection, as for instance a polyvinyl chloride tube. The necessity of weighing relatively large quantities causes high concentrations of the gases to be measured in the catharometer, so that a precise linearization cannot be achieved by simple means, and in connection with the poor zero stability of the integrator results in excessively large errors for the C and H values. The use of a glass tube for the silica gel column requires long periods of time for the elimination of the water; the necessary stability of the flow speed cannot be maintained, when using very short glass capillaries with very small diameter, because even very minor obstructions such as dust particles can result in considerable variations in the flow resistance of the capillary.

In the instrumentation according to this invention, all of the deficiencies enumerated of the above described method, are eliminated to a very large degree.

The invention will now be described with reference to the accompanying illustrative drawings in which:

FIG. 2 is a circuit diagram of the integrator;

FIG. 3 is a longitudinal sectional view of the combustion tube furnace, and

FIG. 4 is a cross-sectional view on the line 4—4 of FIG. 3.

Figure 1:
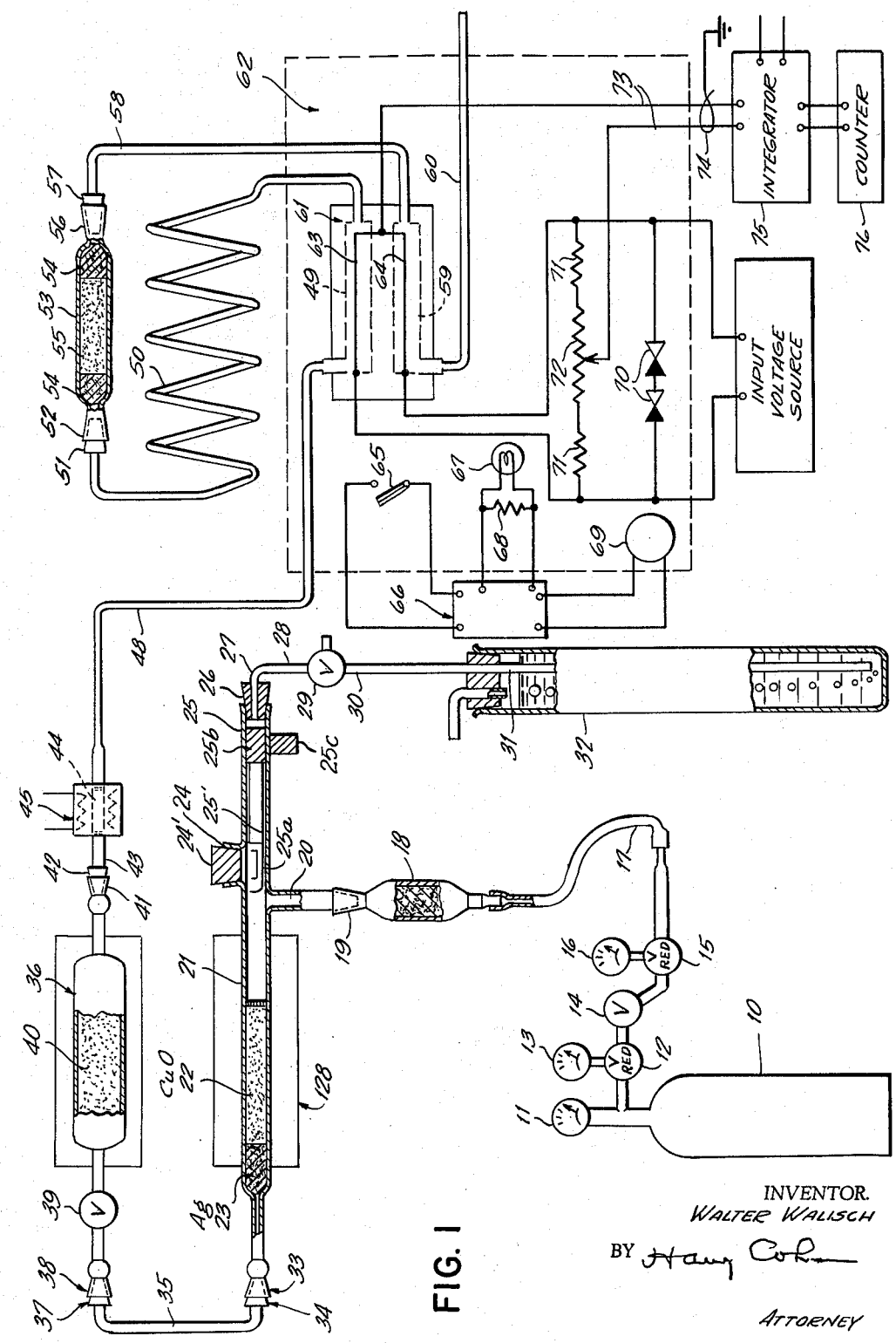
FIG. 1 is an illustration of the apparatus.

The carrying gas, helium with an admixture of no more than 3% oxygen, is contained in one of the commercially available compressed gas cylinders 10. The contents of the cylinder are indicated on pressure-gauge 11; by means of a reduction valve 12, a low pressure is adjusted, which is indicated on pressure gauge 13; through shut-off valve 14, the gas enters precision reduction valve 15, which permits precise adjustment to a pressure of approximately 200 cm. water column, indicated on pressure gauge 16. From here the carrier-gas, by means of a very flexible connection 17 (for instance, a plastic tube), enters absorption tube 18, which contains magnesium perchlorate or another drying agent. The interior diameter and the length of connecting tube 17 are dimensioned such as to permit a simple and breakproof connection between the compressed gas cylinder and the combustion tube, and also to create a flow resistance. This flow resistance must be such that the pressure of about 200 cm. water column, maintained by the precision reduction valve 15, will permit a sufficiently rapid rinsing of the instrumentation, after the introduction of a new sample (flow speed approximately 100 ml./min.), and on the other hand, it must also be sufficient to assure that during combustion there will be a sufficient reduction in pressure at connection tube 17, so that small fluctuations in pressure valve 16 will not adversely affect the flow speed. The absorption tube 18, made of glass having a high softening temperature and a low coefficient of thermal expansion, has a ground-in connection 19 (for instance, ST 5) to the tube section 20, which is fused to a combustion tube 21, all made of quartz. Thus, absorption tube 18 is connected directly and close to combustion tube 21, resulting in greatly improved chemical zero stability. The ground-in connection is protected by a good vacuum grease. This arrangement prevents any water, which might have penetrated into the connection tube through the reduction valve, from entering into the instrument, by retaining it in the absorption tube. Consequently, only the ground-in connection 19, between the absorption tube and the combustion tube 21, must be absolutely leak-proof, which is easily achieved by the method described.

From the lateral tube section 20 on, the carrying gas is divided into two streams. In normal operations, while carrying out a determination, the major portion will travel over the combustion tube packing, consisting of copper oxide 22 and silver wool 23 and in due course into the measuring apparatus. The minor portion passes the lateral opening 24, then through the rear end 25 of the combustion tube, which is closed by a perforated rubber stopper 26, through which runs glass tube 27, connected to a hose 28, and leading to a three-way valve 29, which can be operated electrically or manually. From the three-way valve, this smaller portion of the carrier-gas travels through hose connection 30 and glass tube 31 into glass tube 32, filled with water, and through this water column of about 1.50 meter in height it escapes in the form of gas bubbles. This arrangement makes it possible to maintain under all circumstances the same stable pressure in the combustion tube, which is equal to the height of the water column. An increase in pressure at pressure gauge 16, will only result in an increase in the quantity of gas bubbles ascending in tube 32, and a decrease in pressure will result in a decrease in the quantity of gas bubbles. A platinum tray for the sample is inserted through opening 24 when the closure 24' is momentarily removed. A quartz rod 25' is provided with a forward recessed portion 25a and an attached magnetic member 25b, so that by moving an external magnetic member 25c manually toward and away from oven 128, the platinum tray can be moved into and away from the heated end of the combustion tube 21.

The front end of the combustion tube consists of a female ground-in quartz capsule 33, which is connected to a male ground-in metal core 34, into which is solidly soldered a flexible metal hose 35, connected to the reduction tube 36. The connection is made through male ground-in metal core 37, and female ground-in glass capsule 38. Behind glass capsule 38 is a stop cock 39, which can be operated electrically or manually, and which permits the opening or closing of the passage from 38 to 36. The reduction tube 36 contains a copper packing 40. This packing is prepared by reduction of needle-shaped copper oxide with carbon monoxide at a temperature of about 250° C. Connected to the reduction tube is a female glass capsule 41, with a male ground-in metal core 42, leading to a thin-walled metal tube, containing the silica gel. This silica gel tube has an interior diameter of from 2 to 3 mm. and a length of from 5 to 10 cm. Approximately at the center of this tube is located between two notches the silica gel packing 44 of about 1.5 cm. length, and held in place by two quartz wool plugs. Around that section of tube 43, where the packing 44 is located, there is tightly attached to the tube a resistance coil 45, the length of which is such that the ends of the coil protrude on both sides beyond the silica packing. Into the rear end of the silica tube is solidly soldered a flexible metal tube 48, which establishes the connection to the first cell 49 of a symmetrical catharometer. From this cell the gases pass into a metal coil 50, which is soldered into the exit of the cell. The volume of the metal coil is gauged such as to assure complete combustion of the sample, before the combustion product reaches the end of tube 50. From here the combustion product travels through male metal core 51 and female ground-in glass capsule 52 into absorption tube 53, which contains a packing, consisting of a water absorbing agent 54 (for instance, magnesium perchlorate) and a carbon dioxide absorbing agent 55 (for instance, sodium asbestos). Through another female glass capsule 56 with male ground-in metal core 57 and flexible metal tube 58, the combustion product passes into the second catharometer cell 59, and from there it escapes through capillary 60. The absorption chamber 53 is arranged above coil 50 in such a manner that it can easily be replaced when necessary.

The capillary 60 consists of a flexible plastic or metal tube of such interior diameter and length (for instance, 0.3 mm. and 20 cm. length), so as to cause a flow resistance, which under the pressure caused by the height of the water column 32 will result in a predetermined pressure within the instrument, which will assure a stable flow speed of about 30 ml./min. All other diameters within the instrument are of such dimensions as to permit the total flow resistance within the instrument to be disregarded in relation to the flow resistance within the capillary 60, so that inevitable fluctuations in the flow resistance of the instrument do not bring about changes in the flow speed. By increasing the diameter of capillary 60, the danger of partial or total occlusion of this capillary is almost completely eliminated.

Capillary 60 as well as catharometer block 61, which contains the two cells 49 and 59, mentioned above, are housed in an air thermostat 62. This air thermostat consists of a metal housing, made preferably from a metal which is a good heat conductor as, for instance, aluminum or copper, and the exterior wall of which is insulated against heat loss. The catharometer block 61 is mounted between two copper plates, for the purpose of preventing unequal temperature within the catharometer. Because mechanical vibrations of resistance wires 63 and 64, located inside the catharometer cells, may create electrical disturbances, the lower copper plate is connected to the bottom of the thermostat by means of a material with strong damping characteristics. Inside the thermostat is a small contact thermometer 65, which activates over a transistor relay 66 the heating of the thermostat, which is effected by an incandescent bulb 67 and a resistance 68, by switching it on and off. The incandescent bulb 67 causes a very considerable thermal feedback as a consequence of which the accuracy of the thermostat is substantially better than the sensitivity of the contact thermometer. The homogeneity of the temperature within the thermostat is achieved by a rotating blower 69, whose inlet and output ports are of similar width to the thermostat and which rotates the air within the themostat at high speed (about 10 rev./sec.). In this manner a temperature stability of ±0.01° C. is achieved within the catharometer, at a switching incidence of about 10 switchings/min. This eliminates the necessity of using a liquid circulating thermostat as is required in the known method. Within the thermostat all contact points are heat shielded in such a manner as to prevent any E.M.F. being developed at junctions of dissimilar metals. The thermostat further contains, mounted on a metal of good conductive characteristics, the Zener diodes 70, which are used for the stabilization of the bridge input, as well as the resistance 71 at the reference branch of the measuring bridge and the potentiometer 72, all having a low temperature resistance change characteristic. Through all these devices it is possible to eliminate the necessity of carrying out the measuring operation in a thermostatically controlled room as is necessary in the known procedure.

The current for the Zener diodes 70 is taken from an appropriately calibrated device.

The output potential of the bridge, which to a first approximation is proportional to the concentration of unknown gases in one of the catharometer cells, is conducted through a heat shielded cable 73 through a screened cable 74 to the integrator 75. The integrator, whose circuit diagram is shown in FIG. 2, has compensating networks connected to its input to provide a linear relationship between its output signal and the quantities of carbon dioxide and water vapor over the range of concentrations of interest. A commercially available, line-fed transistor chopper amplifier having a zero stability of better than ±5 microvolts is used as an input amplifier 78.

By utilizing a supply potential of at least 10 volts to the catharometer bridge, the sensitivity of the bridge output potential to the concentration of the unknown gas is markedly increased over that provided by lower supply potentials, to permit the accurate measurement of a relatively smaller range of amounts of carbon dioxide. A more accurate compensation can be made for this smaller range of concentrations. According to this invention, this linearization for carbon dioxide is brought about by inserting parallel to the 33,000-ohm resistance 122 in the generator circuit a resistance 124 of the order of 200,000 ohms and two Zener diodes 126 of reversed polarity a Zener potential of about 4 volts inserted in series. Precise investigation has shown that, contrary to the original assumption, there does not exist any linear relation between the output potential of the bridge and the water concentration in catharometer cell 49. Rather the bridge output potential increases much more rapidly than the water concentration. In order to establish a proportional relation between the water concentration in 49 and the speed of rotation of the integrator motor M, a second linearization line was provided in accordance with this invention. This consists of a dual-throw, dual-pole switch, one pole S3$b$2 of which activates the heating of the silica gel column, while a concurrently connected pole S3$b$1 activates the linearization for the water vapor; whereas another pole S3$a$ activates the linearization link just mentioned for carbon dioxide. Pilot light 120 indicates whether the heater 45 of the silica gel tube and, consequently, the linearization link for the water is in operation. When the switch engages pole S3$a$, the comparatively smaller required linearization for the $CO_2$ and nitrogen is provided, while the higher degree of linearization required in the case of $H_2O$ is provided when the switch engages pole S3$b$1. The integrator motor used in this invention may activate a digital counter, or in the completely automatic process a digital printer. In the latter case, the printing mechanism is activated by a timing motor which is set into motion at the beginning of a combustion process, and which activates the printing mechanism at the precise moment when the integration of each band (carbon dioxide, nitrogen or water) is concluded. Inasmuch as the flow speed and the volume contents of the instruments are both stable, the time periods of the measurements are fixed in every case. To simplify the zero setting on the integrator, which can be done with greater accuracy by means of a potentiometer built into the transistor chopper amplifier, the potential of the integrator motor is indicated by a zero indicator M1, whose base line has been changed through parallel insertion of semi-conductive elements Z1 and Z2 in such a manner, that in the case of a small potential a very large amplitude, and in the case of a large potential a very small amplitude of sensitivity is achieved.

In the known method the combustion tube 21 was located in a normal combustion furnace. The necessary extension of the furnace was achieved by placing the movable auxiliary burner close to the so-called permanent burner. The high temperatures required in this procedure in the combustion tube (about 900° C.) have been attained in the known method through additional insulation and through the application of a higher operating voltage. Through these steps the large heating capacity of the combustion furnace was even further increased, and simultaneously the useful lifetime of the furnace installation considerably reduced. The high heating capacity of the furnace made it necessary, in order to avoid excessive loss of time (heat-up period several hours), to keep the combustion furnace in continuous operation. This, in turn, caused a reduction in the useful life of the packing of the combustion chamber (agglomeration and caking of the copper oxide). A combustion furnace 128 has been developed, which in spite of increased thermal efficiency and substantially better combustion characteristics (only neglible temperature drops at both furnace ends) requires a heat-up period of only 5 minutes (heat-up period means the time until 90% of the final temperature is reached). At the same time through the use of appropriate materials, long useful lifetime of the furnace installation is warranted. The length of the furnace is about 30 cm. The combustion tube is introduced into the furnace to such extent that there is no packing at the rear end of the furnace. Consequently, this eliminates the auxiliary burner required in the known method. The details of the furnace construction are shown in FIG. 3. The furnace consists of two circular endplates 130, made of a heat proof insulating material (for instance, hard asbestos), which have axial bores 132 for the insertion of the combustion tube 21. Arranged around the combustion tube are two or more quartz tubes 134 which are also held in place by the end-plates 130. These quartz tubes contain resistance coils 136 made of suitable material. To the peripheral surfaces of these endplates two semi-cylindrical aluminum reflectors 138 and 140 are attached in such a manner, that the entire interior of the furnace is completely closed. Because the radiant heat emanating from the quartz heating tubes is for all practical purposes completely reflected from the polished aluminum skin of the furnace, there are practially no losses in heat radiation, and the aluminum skin of the furnace does not heat up substantially. Through the use of as pure as possible aluminum with a minimum admixture of magnesium, the aluminum retains its reflective capacity for a long period of time. It is, however, necessary to see to it that the outer skin of the aluminum reflectors remains clean, as otherwise a loss of radiant heat will occur, and the furnace temperature will drop. The upper reflector 140 may be removed for access to the interior of the furnace. The endplates of the furnace are attached to a suitable base plate by means of two thin iron rods, not shown. In order to prevent loss of radiant heat at the furnace ends, a circular aluminum disc, not shown, is attached to, and spaced from, each furnace end.

The reflector furnace described has the following advantages over the ordinary furnaces:

(1) The temperature of the oven is constant over substantially its full length.

(2) The thermal efficiency is substantially improved, even at a furnace diameter of 90 mm.

(3) Short preheating period.

Through the combined action of the various instrument features described herein, the working capacity and efficiency of the instrument covered by this invention, has been vastly increased beyond the level attained by the known instrument, based on the same method.

With sample weights ranging between 0.2 to 0.5 mg. the following maximum limits of error can be guaranteed: in carbon, values errors of ±0.3 absolute percentage; in nitrogen, values errors of ±0.4 absolute percentage; in hydrogen, values errors of ±0.1 absolute percentage.

The duration of analysis has been reduced to the point where it is possible to run five combustions per hour. The small sample quantity now required for the analysis permits also the analysis of highly explosive substances, as well as of compounds with difficult combustion characteristics. Partial or total automation of the servicing processes results in elimination of possible errors to a very large extent.

In simplest version of the instrument of this invention, the introduction of the material into the furnace, the preparation of valves 29 and 39, the activation of the silica gel furnace 45, as well as the setting back of the digital counter, are all done manually. The different values are read at given time intervals from the computer.

In another, largely automated version of the instrument of this invention, all the manual operations just mentioned except the introduction of the sample may be carried out automatically by means of a timing device. In this case, after introducing the combustion carrier into the combustion tube, only the timing device need be activated. The results are automatically printed by a digital print-out device on a paper strip, thereby preventing any reading error.

Still another realization of the instrument of this invention can operate completely automatically in such a manner that the test results, expressed in percentage figures of the concentrations of carbon, hydrogen and nitrogen, are automatically printed. In this version the sample quantity is converted by optical means into a corresponding electrical value (for instance, electrical voltage). This value is fed into the integrator, in which it affects the output signal in such a manner that, instead of obtaining the integral of the bridge output, one obtains the quotient which results from dividing the bridge output by the sample quantity. The three empirically established factors corresponding to the C, H and N values are also fed into the instrument by means of three potentiometers capable of high resolution. An automatic zero adjustment device, which is activated simultaneously with the timing device mentioned above, every time the combustion process is started, returns the integrator to the zero position.

It will be understood that the invention may be embodied otherwise than as herein shown or described and that certain changes in the detail of construction and in the form and arrangement of parts may be made without departing from the underlying idea or principles of this invention within the scope of the appended claims.

What is claimed is:

1. Ultramicro analysis apparatus for measuring the C-H-N contents of an organic sample by the combustion thereof and the subsequent measurement of the gaseous products of such combustion, said apparatus comprising:
   a combustion tube, a reduction tube, and a water absorption tube, said tubes being coupled in series fluid-flow relation in the order mentioned;
   a catharometer having a plurality of cells, each having a respective resistance wire therein, and coupled to said reduction tube to receive a flow of gases therefrom, one of said cells being coupled to said water absorption tube to receive a flow of gases therefrom;
   a voltage integrator in a bridge circuit which includes said catharometer wires and a voltage source, which bridge circuit provides signals to said integrator responsive to the concentrations of C-H-N in the flow of gas through said catharometer;
   an electric heater for said water absorption tube for vaporizing the water therein for flow through said one cell of said catharometer; and
   compensation network means, coupled to said bridge circuit, for linearizing the signal input to said integrator for providing a greater degree of linearization to the signal responsive to the flow of water vapor than is provided to the signals responsive to the flow of $CO_2$ and N.

2. Ultramicro analysis apparatus for measuring the C-H-N content of an organic sample by the combustion thereof and the subsequent measurement of the gaseous products of such combustion, said apparatus comprising:
   a combustion tube, a reduction tube, and a water absorption tube, said tubes being coupled in series fluid-flow relation in the order mentioned;
   a catharometer having a plurality of cells, each having a respective resistance wire therein, and coupled to said reduction tube to receive a flow of gases therefrom, one of said cells being coupled to said water absorption tube to receive a flow of gases therefrom;
   a voltage integrator in a bridge circuit which includes said catharometer wires and a voltage source, which bridge circuit provides signals to said integrator responsive to the concentrations of C-H-N in the flow of gas through said catharometer;
   an electric heater for said water absorption tube for vaporizing the water therein for flow through said one cell of said catharometer; and
   compensation network means, coupled to said bridge circuit, for linearizing the signal input to said integrator, for providing a greater degree of linearization to the signal responsive to the flow of water vapor than is provided to the signals responsive to the flow of $CO_2$ and N; and
   means coupled to said electric heater and to said compensation network means for concurrently actuating said heater to vaporize the water in said absorption tube and said compensation means to provide the greater degree of linearization.

References Cited by the Examiner

UNITED STATES PATENTS

| | | | |
|---|---|---|---|
| 2,294,400 | 9/1942 | Gardner et al. | 219—405 |
| 2,398,874 | 4/1946 | Weyhing | 219—36 |
| 2,520,532 | 8/1950 | Dalgleish et al. | 219—36 |
| 2,731,330 | 1/1956 | Codell. | |
| 2,795,132 | 6/1957 | Boehme et al. | |
| 2,954,826 | 10/1960 | Sievers. | |
| 3,050,372 | 8/1962 | Scott. | |
| 3,065,060 | 11/1962 | Roehrig et al. | 23—253 |
| 3,084,031 | 4/1963 | Kuck et al. | 23—253 |

FOREIGN PATENTS

| | | |
|---|---|---|
| 1,051,386 | 2/1959 | Germany. |
| 331,594 | 7/1930 | Great Britain. |

OTHER REFERENCES

Chemische Berichte, vol. 94, No. 8, pp. 2314–2327 (August 1961).

MORRIS O. WOLK, *Primary Examiner.*